US012676363B2

(12) United States Patent
Takahashi et al.

(10) Patent No.: US 12,676,363 B2
(45) Date of Patent: Jul. 7, 2026

(54) HEAT TRANSFER SUPPRESSION SHEET AND BATTERY PACK

(71) Applicant: IBIDEN CO., LTD., Ogaki (JP)

(72) Inventors: Naoki Takahashi, Ogaki (JP); Hisashi Ando, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 282 days.

(21) Appl. No.: 17/634,792

(22) PCT Filed: Jul. 5, 2021

(86) PCT No.: PCT/JP2021/025378
§ 371 (c)(1),
(2) Date: Feb. 11, 2022

(87) PCT Pub. No.: WO2022/009852
PCT Pub. Date: Jan. 13, 2022

(65) Prior Publication Data
US 2023/0138031 A1 May 4, 2023

(30) Foreign Application Priority Data
Jul. 10, 2020 (JP) ................................. 2020-119430

(51) Int. Cl.
*H01M 10/658* (2014.01)
*H01M 50/204* (2021.01)
(Continued)

(52) U.S. Cl.
CPC ....... *H01M 10/658* (2015.04); *H01M 50/293* (2021.01); *H01M 50/44* (2021.01)

(58) Field of Classification Search
CPC ............................ H01M 10/658; H01M 50/44
See application file for complete search history.

(56) References Cited

U.S. PATENT DOCUMENTS

2016/0244001 A1     8/2016   Chauhan et al.
2019/0178434 A1*    6/2019   Sakatani ............... C04B 41/009
                             (Continued)

FOREIGN PATENT DOCUMENTS

CN          107075805 A       8/2017
GB            2607097 A   * 11/2022   ........... D04H 1/4209
                             (Continued)

OTHER PUBLICATIONS

Machine translation of JP2020063760A from expacenet (Year: 2020).*

(Continued)

*Primary Examiner* — Maria Laios
*Assistant Examiner* — Zackary Richard Cochenour
(74) *Attorney, Agent, or Firm* — Sughrue Mion, PLLC

(57) ABSTRACT

Provided are a heat transfer suppression sheet having an excellent heat transfer prevention effect and excellent retainability of inorganic particles and shape retainability at a high temperature, and a battery pack in which the heat transfer suppression sheet is interposed between battery cells. The heat transfer suppression sheet (10) includes inorganic particles (20), first inorganic fibers (30), and second inorganic fibers (31). The first inorganic fibers (30) are amorphous fibers. The second inorganic fibers (31) contain at least one kind selected from amorphous fibers having a glass transition point higher than that of the first inorganic fibers (30) and crystalline fibers.

15 Claims, 3 Drawing Sheets

(51) Int. Cl.
  *H01M 50/293*     (2021.01)
  *H01M 50/44*      (2021.01)

(56)                References Cited

U.S. PATENT DOCUMENTS

2020/0141300 A1    5/2020  Dietz
2022/0190403 A1*   6/2022  Mizuta ................... D21H 11/18
2023/0118928 A1    4/2023  Takahashi et al.

FOREIGN PATENT DOCUMENTS

JP          2-104611 A      4/1990
JP         10-156835 A      6/1998
JP       2003-27918 A       1/2003
JP      2003-137544 A       5/2003
JP      2010-106381 A       5/2010
JP      2010-155733 A       7/2010
JP      2010-156065 A       7/2010
JP         2012-7247 A      1/2012
JP       2012145204 A  *    8/2012
JP       2013-71848 A       4/2013
JP      2013-204462 A      10/2013
JP      2013-234410 A      11/2013
JP         5683739 B1       3/2015
JP       2016061421 A  *    4/2016
JP       2016-71376 A       5/2016
JP      2018-144176 A       9/2018
JP      2018-206605 A      12/2018
JP      2019-204636 A      11/2019
JP      2019-204637 A      11/2019
JP       2020-63760 A       4/2020
JP      2021-531631 A      11/2021
JP         7000508 B1       1/2022
JP         7000625 B1       1/2022
WO      2019/088195 A1      5/2019
WO      2019/187313 A1     10/2019
WO      2020/023357 A1      1/2020
WO      2020/129274 A1      6/2020
WO      2022/009851 A1      1/2022

OTHER PUBLICATIONS

Machine translation of JP 2019204637A from espacenet (Year: 2019).*
Machine translation of JP 2016061421 A from espacenet (Year: 2016).*
Machine translation of JP 2012145204A from Espacenet (Year: 2012).*
International Search Report (PCT/ISA/210) dated Aug. 3, 2021, issued by the International Searching Authority in counterpart International Application No. PCT/JP2021/025378.
Written Opinion (PCT/ISA/237) dated Aug. 3, 2021, issued by the International Searching Authority in counterpart International Application No. PCT/JP2021/025378.
Recent Trend of Functional Clay Materials, Popular Edition, Jun. 8, 2016, p. 16, pp. 20-27 (total 10 pages).
Shirasu balloon, Maarlite®, Website, Marunakahakudo Inc., Jun. 20, 2022, http:www.marunakahakudo.co.jp/balloon/index.html (total 5 pages).
Vansil® W-50 Wollastonite, Specification, Feb. 26, 2020 (total 1 page).
Fine Mesh Specification Table, Website, Jun. 15, 2022, http://www.sogyo.co.jp/mesh_jis/ (total 3 pages).
Catalog of High-Performance Additive Agent, 3M Japan Limited, p. 9, published on 2019 (total 4 pages).
Terminology Dictionary of Powder Technology, 2nd Edition, Mar. 30, 2000, pp. 375-377 (total 9 pages).
Powder Technology Handbook, Feb. 25, 2014, pp. 7-8, pp. 26-27, pp. 31-33, p. 39, p. 70 (total 13 pages).

The Story of Nanoparticles, Dec. 30, 2006, p. 90 (total 5 pages).
Precise Knowledge How to Prepare and Use Particle Dispersed Liquid, Nov. 25, 2016, pp. 7-8, pp. 12-13 (total 8 pages).
New Textile General Dictionary, Senken Shimbun Co., Ltd., Feb. 1, 2012, pp. 149-150 (total 8 pages).
Product Information Website, Wollastonite, Jun. 14, 1992, http://www.nippon-talc.co.jp/products/wollastonite (total 10 pages).
Fabrication of potassium titanate whisker/aluminum composites and some their properties, Light Metals, 1988, vol. 38, No. 9, pp. 515-521 (total 10 pages).
Basic Knowledge of Technical Fiber and Textiles, Jan. 28, 2011, p. 160 (total 5 pages).
Encyclopaedia Chimica 6, Dec. 15, 1963, pp. 696-697 (total 9 pages).
Powder Technology Handbook, Feb. 25, 2014, p. 663 (total 6 pages).
Product and Application of High-Purity Silica, Sep. 13, 1999, p. 265 (total 6 pages).
Characteristics and Applications of Gel method Silica, TOSOH Research & Technology Review, vol. 45, 2001, pp. 65-69 (total 9 pages).
Information Sheet for Nanomaterial, Amorphous Silica Colloidal Particles, Nissan Chemical Corporation, Jun. 2018 (total 17 pages).
Product Catalog Nippon Aerosil® Co., Ltd., vol. 10, Feb. 1990 (total 12 pages).
Silica Aerogel Composites, 2016, p. 18, p. 44, p. 99 (total 5 pages).
Encyclopedic Dictionary of Chemistry, Jun. 1, 2002, p. 468, p. 1659 (total 8 pages).
Glass Encyclopedia, Oct. 20, 2007, pp. 584-585 (total 5 pages).
New Textile General Dictionary, Senken Shimbun Co., Ltd., Feb. 1, 2012, p. 227 (total 5 pages).
Bio Soluble Fiber Insulation, Aichi Center for Industry and Science Technology News, Mar. 20, 2019, p. 5 (total 3 pages).
NICHIAS Technical Report, vol. 4, No. 395, Oct. 8, 2021, pp. 14-17 (total 9 pages).
NICHIAS Technical Report, vol. 3, No. 392, Jul. 1, 2018, pp. 12-17 (total 11 pages).
Basic Knowledge of Technical Fiber and Textiles, Jan. 28, 2011, p. 143, pp. 210-211 (total 7 pages).
International Search Report (PCT/ISA/210) and Written Opinion (PCT/ISA/237) dated Aug. 3, 2021, issued by the International Searching Authority in counterpart International Application No. PCT/JP2021/025378.
Office Action dated Jul. 3, 2024, issued by the Korean Intellectual Property Office in Korean Patent Application No. 10-2022-7027804.
Horiuchi, Osamu, "Wet Dehydration and Molding Technology of Heat-resistant and Thermal Insulation Products (Part 2)", Nichias Technical Journal, No. 1, 2022. (17 pages total).
"A method of making paper having a high content of inorganic powder", Japan Tappi Journal, vol. 43, No. 1, 1989. (21 pages total).
Fukuoka, Moe et al., "Development of Mineral Hybrid Fiber from Calcium Carbonate and Pulp Using Fluid-jet Cavitation", Japan Tappi Journal, vol. 73, No. 11, 2019. (28 pages total).
The Ceramic Society of Japan, "Ceramics Encyclopedia Second Edition", Maruzen Co., Ltd., Mar. 25, 1997, pp. 202-203, pp. 570-571, (6 total pages).
Ogawa, "English-Japanese Plastic Industry Dictionary 5th Edition 2nd Printing", Kogyo Chosakai Publishing Co., LTD., 1974, pp. 82-83, p. 1300, (5 total pages).
Editorial Board of the Encyclopedia of Chemistry, "Encyclopedia of Chemistry 2", Kyoritsu Shuppan Co., LTD., Sep. 15, 1980, pp. 840-841, (5 total pages).
The Ceramic Society of Japan, "Ceramics Encyclopedia Second Edition", Maruzen Co., Ltd., Mar. 25, 1997, pp. 162-165, (6 total pages).
Katsunori Homma, "Measurements of Airborne Fibrous Particles", Man-Made Mineral Fibers (MMMF), Journal of Aerosol Research, vol. 6, No. 1, 1991, pp. 17-24, Japan Association of Aerosol Science and Technology, DOI: https://doi.org/10.11203/jar.6.17.

(56) References Cited

OTHER PUBLICATIONS

Extended European Search Report issued Aug. 27, 2024 by the European Patent Office in European Patent Application No. 21838189. 5.

\* cited by examiner

HEAT TRANSFER SUPPRESSION SHEET AND BATTERY PACK

CROSS-REFERENCE TO RELATED APPLICATIONS

This application is a National Phase Entry of PCT International Application No. PCT/JP2021/025378, filed on Jul. 5, 2021, which claims priority to Japanese Patent Application No. 2020-119430 filed on Jul. 10, 2020, the contents of all of which are incorporated herein by reference in their entirety.

TECHNICAL FIELD

The present invention relates to a heat transfer suppression sheet and a battery pack in which the heat transfer suppression sheet is interposed between battery cells.

BACKGROUND ART

In recent years, an electric vehicle, a hybrid vehicle, or the like driven by an electric motor has been actively developed from a viewpoint of environmental protection. A battery pack in which a plurality of battery cells is connected in series or in parallel is mounted on the electric vehicle, the hybrid vehicle, or the like to serve as a power source of a driving electric motor.

A lithium ion secondary battery capable of high capacity and high output as compared with a lead storage battery, a nickel-metal hydride battery, or the like is mainly used as the battery cell. Then, when a thermal runaway occurs in which a certain battery cell rapidly rises in temperature due to an internal short circuit, overcharge, or the like of the battery and then continues to generate heat, the heat from the battery cell in which the thermal runaway occurs may propagate to another adjacent battery cell to cause the thermal runaway of another battery cell.

As a technique for preventing the propagation of heat from the battery cell in which the thermal runaway occurs as described above, a heat transfer suppression sheet is interposed between the battery cells. For example, Patent Literature 1 proposes a heat transfer suppression sheet containing at least one of a mineral powder and a flame retardant, and a matrix resin selected from a thermosetting resin, a thermoplastic elastomer, and a rubber.

CITATION LIST

Patent Literature

Patent Literature 1: JP-A-2018-206605

SUMMARY OF INVENTION

Technical Problem

In such a heat transfer suppression sheet, it is required to satisfactorily retain powder having a heat transfer prevention effect (that is, to prevent powder falling), and to retain a shape and continue to be present between battery cells even when the battery cells are heated to a high temperature due to thermal runaway. In the heat transfer suppression sheet described in Patent Literature 1, a matrix resin is used in order to retain a mineral powder and a flame retardant. However, such a matrix resin is melted at the high temperature. Therefore, in the heat transfer suppression sheet described in Patent Literature 1, the shape may not be retained when the thermal runaway occurs in the battery cell.

Accordingly, an object of the present invention is to provide a heat transfer suppression sheet capable of preventing falling of powder or the like having a heat transfer prevention effect and having excellent shape retainability at a high temperature, and a battery pack in which the heat transfer suppression sheet is interposed between battery cells.

Solution to Problem

The above object is achieved by the heat transfer suppression sheet of the following (1) according to the present invention.

(1) A heat transfer suppression sheet includes: inorganic particles; first inorganic fibers; and second inorganic fibers, in which the first inorganic fibers are amorphous fibers, and the second inorganic fibers contain at least one kind selected from amorphous fibers having a glass transition point higher than that of the first inorganic fibers and crystalline fibers.

The heat transfer suppression sheet according to the present invention is preferably (2) to (17) below.

(2) The heat transfer suppression sheet according to (1), in which the first inorganic fibers have a glass transition point of less than 700° C.

(3) The heat transfer suppression sheet according to (1) or (2), in which an average fiber diameter of any one of the first inorganic fibers and the second inorganic fibers is larger than an average fiber diameter of the other.

(4) The heat transfer suppression sheet according to (3), in which the average fiber diameter of the first inorganic fibers is larger than the average fiber diameter of the second inorganic fibers.

(5) The heat transfer suppression sheet to any one of (1) to (4), in which the first inorganic fibers are fibers containing $SiO_2$, and the second inorganic fibers are fibers containing at least one kind selected from silica fibers, alumina fibers, alumina silicate fibers, zirconia fibers, and mineral-based fibers.

(6) The heat transfer suppression sheet according to (5), in which the first inorganic fibers are glass fibers, and the second inorganic fibers are the mineral-based fibers.

(7) The heat transfer suppression sheet according to any one of (1) to (6), in which the inorganic particles have an average secondary particle diameter of 0.01 μm or more and 200 μm or less.

(8) The heat transfer suppression sheet according to any one of (1) to (7), in which the inorganic particles contain at least one kind selected from oxide particles, carbide particles, nitride particles, and inorganic hydrate particles.

(9) The heat transfer suppression sheet according to (8), in which the inorganic particles contain the oxide particles.

(10) The heat transfer suppression sheet according to (9), in which the oxide particles have an average primary particle diameter of 0.001 μm or more and 50 μm or less.

(11) The heat transfer suppression sheet according to any one of (8) to (10), in which the oxide particles contain at least one kind selected from silica, titania, zirconia, zircon, barium titanate, zinc oxide, and alumina.

(12) The heat transfer suppression sheet according to any one of (8) to (11), in which the inorganic particles contain at least one kind selected from nanoparticles, hollow particles, and porous particles.

(13) The heat transfer suppression sheet according to (12), in which the inorganic particles contain the nanoparticles.

(14) The heat transfer suppression sheet according to (12) or (13), in which the nanoparticles are silica nanoparticles.

(15) The heat transfer suppression sheet according to any one of (12) to (14), in which the nanoparticles have an average primary particle diameter of 1 nm or more and 100 nm or less.

(16) The heat transfer suppression sheet according to any one of (11) to (15), in which the oxide particles contain titania.

(17) The heat transfer suppression sheet according to any one of (1) to (16), in which, with respect to a total mass of the heat transfer suppression sheet, a content of the inorganic particles is 30 mass % or more and 94 mass % or less, a content of the first inorganic fibers is 3 mass % or more and 30 mass % or less, and a content of the second inorganic fibers is 3 mass % or more and 30 mass % or less.

The object of the present invention is achieved by the configuration of the following (18) related to a battery pack.

(18) A battery pack, in which a plurality of battery cells is connected in series or in parallel, and the heat transfer suppression sheet according to any one of (1) to (17) is interposed between the battery cells.

Advantageous Effects of Invention

Since the heat transfer suppression sheet according to the present invention contains inorganic particles having an excellent heat transfer prevention effect and inorganic fibers, the heat transfer prevention effect is excellent.

In the heat transfer suppression sheet according to the present invention, since the first inorganic fibers and the second inorganic fibers are entangled to form a network, the inorganic particles can be satisfactorily retained in the network.

Further, when the heat transfer suppression sheet according to the present invention is exposed to a high temperature, a surface of the first inorganic fibers, which are amorphous fibers having a low glass transition point, is softened relatively early, and the inorganic particles and the second inorganic fibers are bound. Accordingly, the heat transfer suppression sheet according to the present invention can improve the mechanical strength at the high temperature. Further, the heat transfer suppression sheet may receive a pressing force due to expansion caused by thermal runaway of the battery cell or may receive a wind pressure caused by ignition of the battery cell. Since the heat transfer suppression sheet according to the present invention has excellent mechanical strength at the high temperature, the heat transfer suppression sheet can resist these external forces.

In the battery pack according to the present invention, the above-described heat transfer suppression sheet is interposed between the battery cells. Therefore, the battery pack according to the present invention can minimize a damage of the thermal runaway of the battery cell.

DESCRIPTION OF EMBODIMENTS

Figure 1:
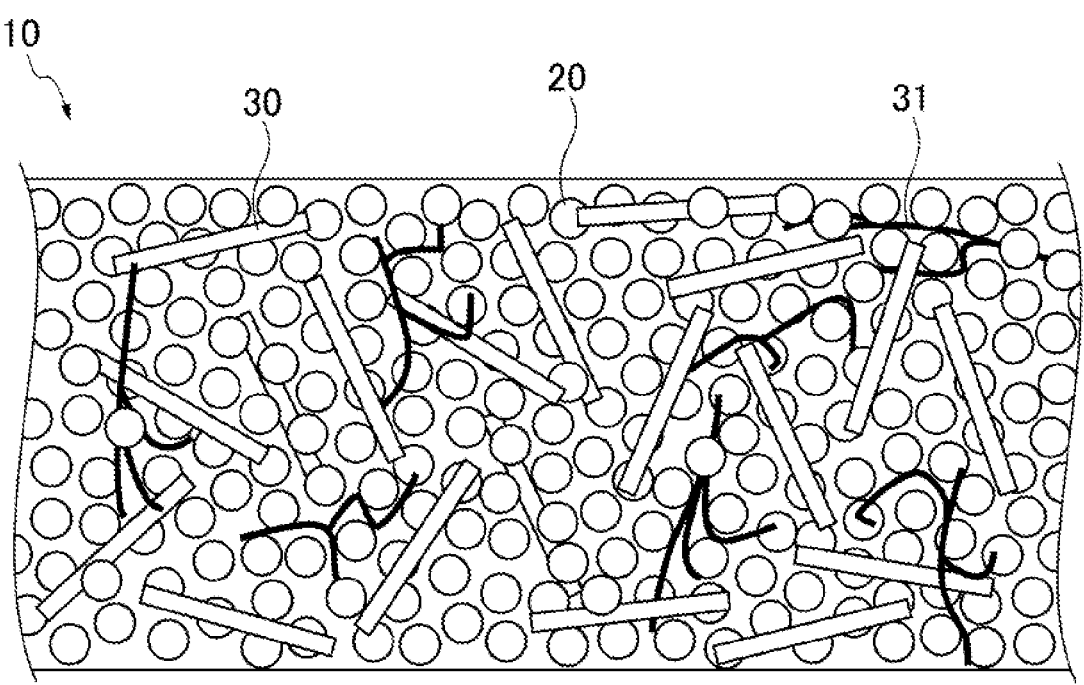
FIG. 1 is a cross-sectional view schematically showing an embodiment of a heat transfer suppression sheet according to the present invention.

Hereinafter, an embodiment of a heat transfer suppression sheet and a battery pack according to the present invention will be described in detail with reference to the drawings. The present invention is not limited to the embodiment described below. In the drawings, members and portions having the same functions may be denoted by the same reference numerals, and duplicate descriptions may be omitted or simplified. The embodiment described in the drawings are schematically illustrated for clear explanation of the present invention, and do not necessarily accurately represent actual sizes and scales.

[1. Heat Transfer Suppression Sheet]

Figure 2:
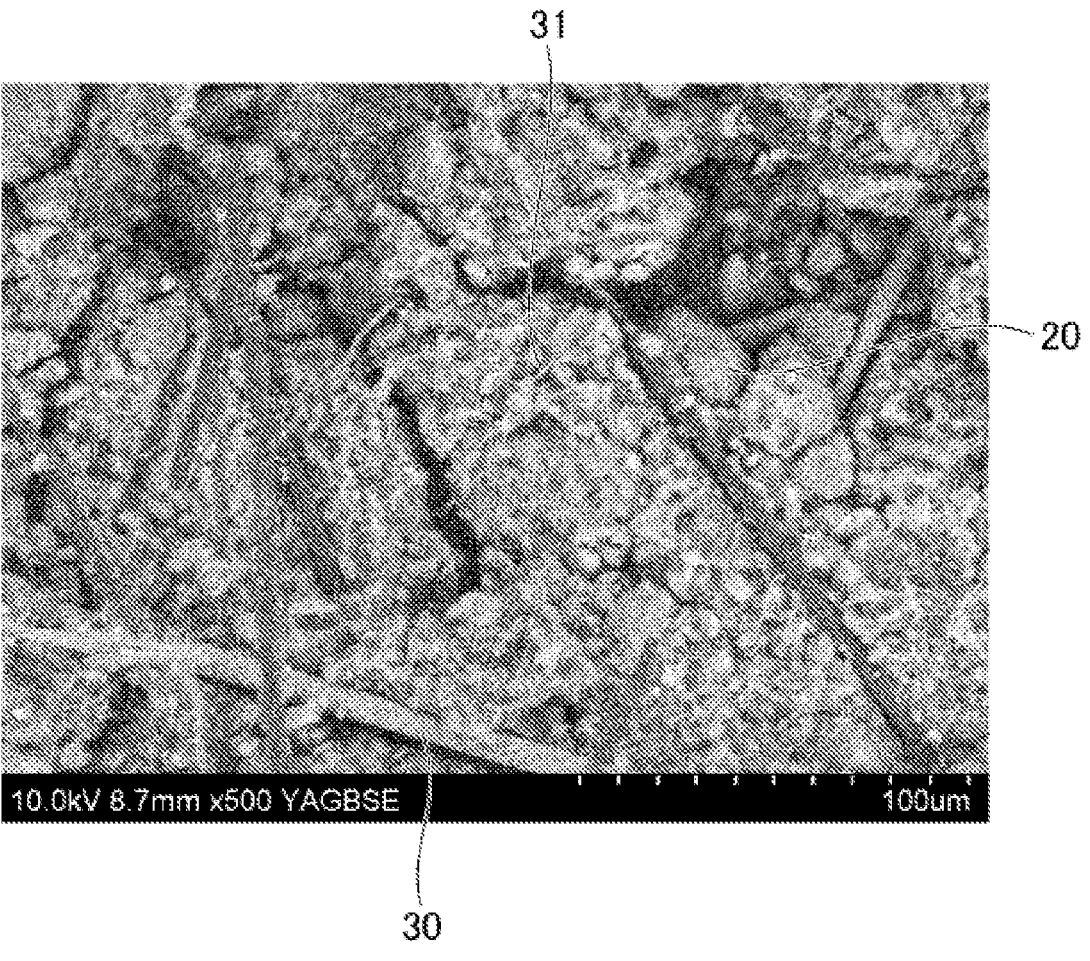
FIG. 2 is an SEM photograph showing a cross section of the heat transfer suppression sheet according to the embodiment of the present invention produced by a dry extrusion molding method.
Figure 3:
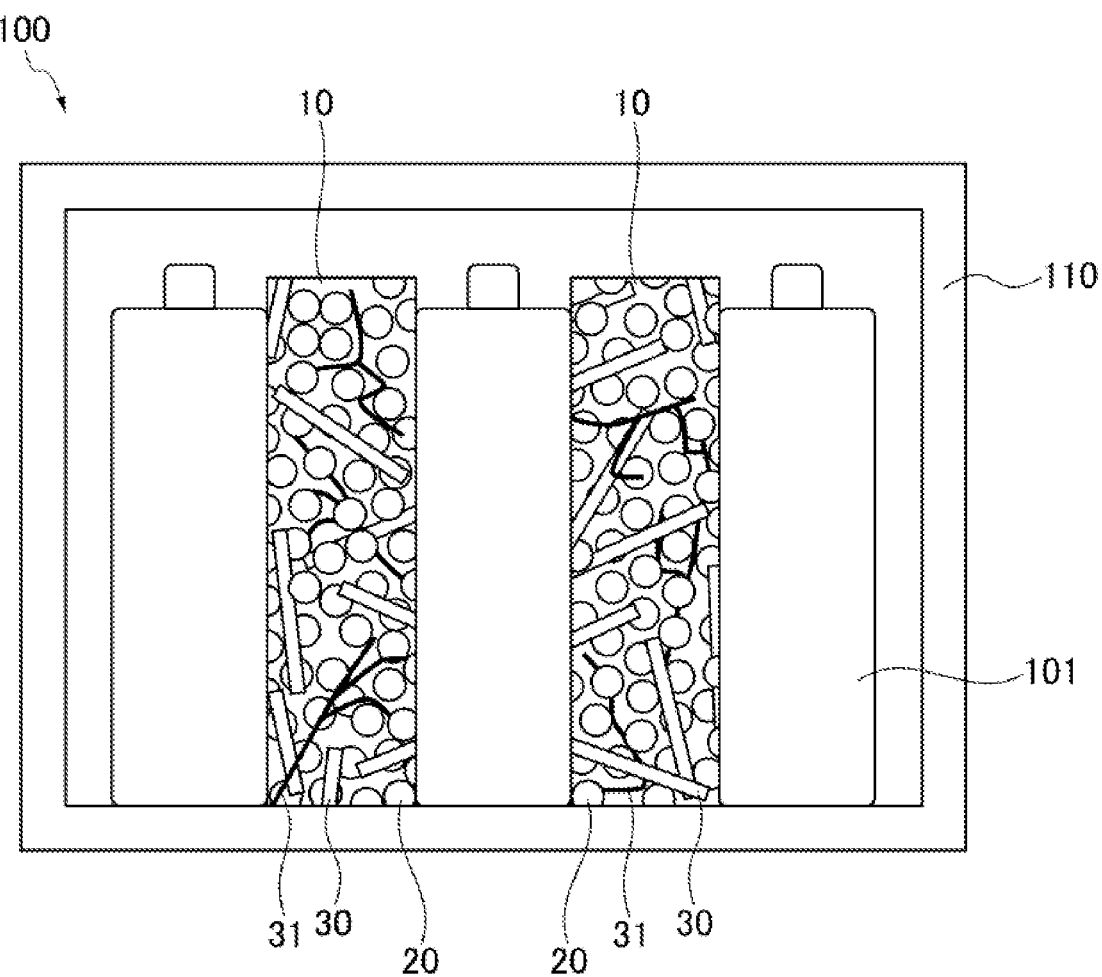
FIG. 3 is a cross-sectional view schematically showing an embodiment of a battery pack according to the present invention.

FIG. 1 is a cross-sectional view schematically showing an embodiment of a heat transfer suppression sheet according to the present invention. An illustrated heat transfer suppression sheet 10 includes inorganic particles 20, first inorganic fibers 30, and second inorganic fibers 31. The inorganic particles 20, the first inorganic fibers 30, and the second inorganic fibers 31 are all heat resistant materials, and furthermore, innumerable minute spaces are formed between the particles, between the particles and the fibers, and between the fibers, and a heat insulating effect by air is also exhibited, so that heat transfer prevention performance is excellent. As shown in FIGS. 1-3, the first inorganic fibers 30 and the second inorganic fibers 31 are randomly oriented, respectively;

<1-1. Inorganic Particles>

Although a material of the inorganic particles is not particularly limited, from the viewpoint of the heat transfer prevention effect, the inorganic particles 20 preferably contain at least one selected from oxide particles, carbide particles, nitride particles, and inorganic hydrate particles, and more preferably contain oxide particles.

A shape and a size of the inorganic particles 20 are also not particularly limited. It is preferable that the inorganic particles 20 contain at least one selected from nanoparticles, hollow particles, and porous particles, and it is more preferable that the inorganic particles 20 contain nanoparticles.

As the inorganic particles 20, a single kind of inorganic particles may be used, or two or more kinds of inorganic particles 20 may be used in combination. When two or more kinds of the inorganic particles 20 having different heat transfer prevention effects are used in combination, a heating element can be cooled in multiple stages, and an endothermic effect can be exhibited in a wider temperature range. It is also preferable to use a mixture of large-diameter particles and small-diameter particles as the inorganic particles 20. When the small-diameter inorganic particles 20 enter gaps between the large diameter inorganic particles 20, a structure becomes denser, and the heat transfer prevention effect can be improved.

When the average secondary particle diameter of the inorganic particles 20 is 0.01 μm or more, it makes the inorganic particles 20 easily available, and an increase in production cost can be prevented. In a case of 200 μm or less, a desired heat insulating effect can be obtained. Therefore, an average secondary particle diameter of the inorganic particles 20 is preferably 0.01 μm or more and 200 μm or less, and more preferably 0.05 μm or more and 100 μm or less.

Next, an example of the material or the shape of particles that can be used as the inorganic particle 20 will be described in detail below.

(1-1-1. Oxide Particles)

Since oxide particles have a high refractive index and a strong effect of diffusely reflecting light, when the oxide particles are used as the inorganic particles, radiant heat transfer can be prevented particularly in a high temperature region such as abnormal heat generation. As the oxide particles, particles of at least one selected from silica, titania, zirconia, zircon, barium titanate, zinc oxide, and alumina can be used. That is, among the oxide particles that can be used as inorganic particles, only one kind may be used, or two or more kinds of oxide particles may be used. In particular, silica is a component having high heat insulating property, titania is a component having a refractive index higher than that of other metal oxides, and has a high effect of diffusely reflecting light and blocking radiant heat in a high temperature region of 500° C. or higher. Therefore, silica and titania are most preferably used as the oxide particles.

(Average Primary Particle Diameter of Oxide Particles: 0.001 μm or More and 50 μm or Less)

Since a particle diameter of the oxide particles may affect influence of reflecting the radiant heat, when an average primary particle diameter is limited to a predetermined range, higher heat insulating property can be obtained.

That is, when the average primary particle diameter of the oxide particles is 0.001 μm or more, the average primary particle diameter is sufficiently larger than a wavelength of the light contributing to heating, and the light is efficiently diffusely reflected. Therefore, the radiant heat transfer of heat in the heat transfer suppression sheet is prevented in the high temperature region of 500° C. or more, and the heat insulating property can be further improved. On the other hand, when the average primary particle diameter of the oxide particles is 50 μm or less, contact points and the number between the particles are not increased even when the oxide particles are compressed, and it is difficult to form a path of conductive heat transfer. Therefore, in particular, it is possible to reduce the influence on the heat insulating property in a normal temperature range in which the conductive heat transfer is dominant.

When two or more kinds of oxide particles are used, it is also preferable to use a mixture of the large-diameter particles and the small-diameter particles (nanoparticles). In this case, the average primary particle diameter of the large-diameter particles is more preferably 1 μm or more and 50 μm or less, still more preferably 5 μm or more and 30 μm or less, and most preferably 10 μm or less.

In the present invention, the average primary particle diameter can be determined by observing particles with a microscope, comparing with a standard scale, and averaging any of 10 particles.

(1-1-2. Nanoparticles)

In the present invention, the nanoparticles represent nanometer-order particles having an average primary particle diameter of less than 1 μm which are spherical particles or particles close to the spherical shape. Since the nanoparticles have a low density, conductive heat transfer is prevented, and when the nanoparticles are used as the inorganic particles, voids are further finely dispersed, and thus excellent heat insulating property of preventing convective heat transfer can be obtained.

Therefore, it is preferable to use the nanoparticles from the viewpoint that heat conduction between adjacent nanoparticles can be prevented when a battery in a normal ordinary temperature range is used.

In the present invention, at least one kind of the oxide particles, the carbide particles, the nitride particles, and the inorganic hydrate particles selected as the inorganic particles is preferably the nanoparticles.

Further, when the nanoparticles having a small average primary particle diameter are used as the oxide particles, even when the heat transfer suppression sheet is compressed due to expansion caused by thermal runaway of the battery cell and an internal density increases, an increase in conductive heat transfer of the heat transfer suppression sheet can be prevented. It is considered that this is because nanoparticles form fine voids easily between the particles due to a repulsive force caused by static electricity, and a bulk density is low, and thus the particles are filled so as to have cushioning properties.

In the present invention, when the nanoparticles are used as the inorganic particles, the material is not particularly limited as long as the material conforms to the definition of the nanoparticles as described above. For example, since silica nanoparticles are a material having high heat insulating property and have small contact points between the particles, an amount of heat conducted by the silica nanoparticles is smaller than that in the case where silica particles having a large particle diameter are used. Since the generally available silica nanoparticles have a bulk density of about 0.1 g/cm³, for example, even when the battery cells disposed on both sides of a heat insulation sheet thermally expand and a large compressive stress is applied to the heat insulation sheet, a size (area) and the number of contact points between the silica nanoparticles do not significantly increase, and the heat insulating property can be maintained. Therefore, the silica nanoparticles are preferably used as the nanoparticles. As the silica nanoparticles, wet silica, dry silica, aerogel, and the like can be used.

As described above, titania has a high effect of blocking radiant heat, the silica nanoparticles have extremely small conductive heat transfer, and can maintain excellent heat insulating property even when the compressive stress is applied to the heat insulation sheet. Therefore, it is most preferable to use both titania and silica nanoparticles as the inorganic particles.

(Average Primary Particle Diameter of Nanoparticles: 1 nm or More and 100 nm or Less)

When the average primary particle diameter of the nanoparticles is limited to a predetermined range, even higher heat insulating property can be obtained.

That is, when the average primary particle diameter of the nanoparticles is 1 nm or more and 100 nm or less, the convection heat transfer and conductive heat transfer of heat in the heat transfer suppression sheet can be prevented particularly in a temperature range of less than 500° C., and the heat insulation property can be further improved. Even when the compressive stress is applied, the voids remaining between the nanoparticles and the contact points between many particles can prevent the conductive heat transfer, and the heat insulating property of the heat transfer suppression sheet can be maintained.

The average primary particle diameter of the nanoparticles is more preferably 2 nm or more, and still more preferably 3 nm or more. On the other hand, the average primary particle diameter of the nanoparticles is more preferably 50 nm or less, and still more preferably 10 nm or less.

(1-1-3. Inorganic Hydrate Particles)

The inorganic hydrate particles are thermally decomposed at equal to or higher than the thermal decomposition initiation temperature by receiving heat from a heating element, and release crystal water possessed by the inorganic hydrate particles to lower the temperature of the heating element and surroundings thereof, that is, exhibit a so-called "endothermic effect". In addition, after the crystal water is released, a porous body is formed, and a heat insulating effect is exhibited by a large number of air holes.

Specific examples of the inorganic hydrate include aluminum hydroxide ($Al(OH)_3$), magnesium hydroxide ($Mg(OH)_2$), calcium hydroxide ($Ca(OH)_2$), zinc hydroxide ($Zn(OH)_2$), iron hydroxide ($Fe(OH)_2$), manganese hydroxide ($Mn(OH)_2$), zirconium hydroxide ($Zr(OH)_2$), and gallium hydroxide ($Ga(OH)_3$).

For example, aluminum hydroxide has about 35% of crystal water. As shown in the following formula, the aluminum hydroxide is thermally decomposed to release the crystal water, thereby exhibiting the endothermic effect. After the crystal water is discharged, alumina ($Al_2O_3$), which is the porous body, functions as a heat insulator.

$$2Al(OH)_3 \rightarrow Al_2O_3 + 3H_2O$$

As described later, in the battery pack according to the present invention, the heat transfer suppression sheet 10 is interposed between the battery cells. In the battery cell in which the thermal runaway occurs, the temperature rapidly rises to a temperature exceeding 200° C., and the temperature continues to rise to around 700° C. Therefore, the inorganic particles preferably contain an inorganic hydrate having a thermal decomposition initiation temperature of 200° C. or higher.

The thermal decomposition initiation temperature of the inorganic hydrate described above is about 200° C. for aluminum hydroxide, about 330° C. for magnesium hydroxide, about 580° C. for calcium hydroxide, about 200° C. for zinc hydroxide, about 350° C. for iron hydroxide, about 300° C. for manganese hydroxide, about 300° C. for zirconium hydroxide, and about 300° C. for gallium hydroxide. All of the hydrates are preferably inorganic hydrates since the temperature substantially overlaps with a temperature range of a rapid temperature rise of the battery cell in which the thermal runaway occurs and can efficiently prevent the temperature rise.

When the inorganic hydrate particles are used as the inorganic particles 20, if the average particle diameter thereof is too large, a certain amount of time is required for the inorganic particles 20 (inorganic hydrate) in the vicinity of a center of the heat transfer suppression sheet 10 to reach the thermal decomposition temperature thereof, and thus the inorganic particles 20 in the vicinity of the center of the sheet may not be completely thermally decomposed. Therefore, the average secondary particle diameter of the inorganic hydrate particles is preferably 0.01 µm or more and 200 µm or less, and more preferably 0.05 µm or more and 100 µm or less.

<1-2. First Inorganic Fiber>

The first inorganic fibers 30 are amorphous fibers. The second inorganic fibers are fibers containing at least one selected from amorphous fibers having a glass transition point higher than that of the first inorganic fibers and crystalline fibers. A melting point of the crystalline inorganic fibers is usually higher than the glass transition point of the amorphous inorganic fibers. Therefore, when the first inorganic fibers 30 are exposed to a high temperature, surfaces of the first inorganic fibers 30 are softened before the second inorganic fibers 31 are softened to bind the inorganic particles 20 and the second inorganic fibers 31, and thus a mechanical strength of the heat transfer suppression sheet 10 can be improved.

Specifically, the first inorganic fibers 30 are preferably inorganic fibers having the melting point of less than 700° C., and many amorphous inorganic fibers can be used. Among these, fibers containing $SiO_2$ are preferable, and glass fibers are more preferable since that the glass fibers are inexpensive, easily available, and excellent in handleability and the like.

<1-3. Second Inorganic Fiber>

As described above, the second inorganic fibers 31 are fibers containing at least one kind selected from amorphous fibers having a glass transition point higher than that of the first inorganic fibers and crystalline fibers. As the second inorganic fibers 31, many crystalline inorganic fibers can be used.

When the second inorganic fibers 31 contain crystalline fibers or have the glass transition point higher than that of the first inorganic fibers 30, the second inorganic fibers 31 are not melted or softened even if the first inorganic fibers 30 are softened when exposed to a high temperature. Therefore, the shape can be maintained even at the time of thermal runaway of the battery cell, and it can continue to exist between the battery cells.

When the second inorganic fibers 31 are not melted or softened, minute spaces are maintained between the inorganic particles 20, between the inorganic particles 20 and the first inorganic fibers and the second inorganic fibers, and between the first inorganic fibers and the second inorganic fibers. Therefore, the heat insulating effect by air is exhibited, and excellent heat transfer prevention performance can be maintained.

When the second inorganic fibers 31 are crystalline, examples of the second inorganic fibers 31 include ceramic-based fibers such as silica fibers, alumina fibers, alumina silicate fibers, and zirconia fibers, and mineral-based fibers such as rock wool, alkaline earth silicate fibers, zirconia fibers, potassium titanate fibers, and wollastonite.

Among the fibers exemplified as the second inorganic fibers 31, when the melting point is higher than 1000° C., the second inorganic fibers 31 do not melt or soften even when the thermal runaway of the battery cell occurs, and the shape thereof can be maintained.

Among the fibers exemplified as the second inorganic fibers 31, for example, the ceramic-based fibers such as silica fibers, alumina fibers, and alumina silicate fibers, and the mineral-based fibers are more preferably used. Among these, fibers having a melting point of more than 1000° C. are further preferably used.

Even when the second inorganic fibers 31 are amorphous, fibers having the glass transition point higher than that of the first inorganic fibers 30 can be used. For example, the glass fiber having the glass transition point higher than that of the first inorganic fiber 30 may be used as the second inorganic fiber 31.

As the second inorganic fibers 31, the various inorganic fibers exemplified above may be used alone, or two or more kinds thereof may be used in combination.

As described above, the first inorganic fibers 30 have a lower glass transition point than the second inorganic fibers 31. When exposed to the high temperature, the first inorganic fibers 30 soften first, so that the inorganic particles 20 and the second inorganic fibers 31 can be bound by the first inorganic fibers 30. However, for example, when the second inorganic fibers 31 are amorphous and a fiber diameter thereof is smaller than a fiber diameter of the first inorganic fibers 30, if the glass transition points of the first inorganic fibers 30 and the second inorganic fibers 31 are close to each other, the second inorganic fibers 31 may be softened first.

Therefore, when the second inorganic fibers 31 are amorphous fibers, the glass transition point of the second inorganic fibers 31 is preferably higher than the glass transition point of the first inorganic fibers 30 by 100° C. or more, and more preferably 300° C. or more.

<1-4. Average Fiber Diameter of Inorganic Fibers>

In the present invention, the inorganic fibers having a large average fiber diameter (large diameter) have an effect of improving the mechanical strength and shape retainability of the heat transfer suppression sheet 10. In a case where any one of the first inorganic fibers 30 and the second inorganic fibers 31 have a large diameter, the above effect can be obtained. Since an impact from the outside may act on the heat transfer suppression sheet 10, impact resistance is enhanced by including large-diameter inorganic fibers. The impact from the outside is, for example, a pressing force due to expansion of the battery cell, or a wind pressure due to ignition of the battery cell.

In order to improve the mechanical strength and the shape retainability of the heat transfer suppression sheet 10, the large-diameter inorganic fibers have particularly preferably a linear shape or a needle shape. The fiber having the linear shape or the needle shape refers to a fiber having a crimp degree described later of, for example, less than 10%, preferably 5% or less.

More specifically, in order to improve the mechanical strength and the shape retainability of the heat transfer suppression sheet 10, the average fiber diameter of the large-diameter inorganic fibers is preferably 1 μm or more, and more preferably 3 μm or more. If the large-diameter inorganic fiber is too thick, moldability and processability of the heat transfer suppression sheet 10 may be reduced. Therefore, the average fiber diameter is preferably 20 μm or less, and more preferably 15 μm or less.

If the large-diameter inorganic fibers are too long, the moldability and the processability may be reduced. Therefore, a fiber length is preferably 100 mm or less. Further, if the large-diameter inorganic fibers are too short, since the shape retainability and the mechanical strength are reduced, the fiber length is preferably 0.1 mm or more.

On the other hand, inorganic fibers having a small average fiber diameter (small diameter) have an effect of improving the retainability of the inorganic particles 20 and increasing flexibility of the heat transfer suppression sheet 10. Therefore, in a case where the other of the first inorganic fibers 30 and the second inorganic fibers 31 have a small diameter, the above-described effect can be obtained.

More specifically, in order to improve the retainability of the inorganic particles 20, it is preferable that the small-diameter inorganic fibers are easily deformed and have flexibility. Therefore, the average fiber diameter of the small-diameter inorganic fibers is preferably less than 1 μm, and more preferably 0.1 μm or less. However, if the small-diameter inorganic fibers are too thin, the fibers are easily broken, and an ability to retain the inorganic particles 20 is reduced. In addition, a proportion of the fibers present in the sheet in an entangled state without retaining the inorganic particles 20 increases, and in addition to a reduction in the ability to retain the inorganic particles 20, the moldability and the shape retainability are also deteriorated. Therefore, the average fiber diameter of the small-diameter inorganic fibers is preferably 1 nm or more, and more preferably 10 nm or more.

When the small-diameter inorganic fibers are too long, since the moldability and the shape retainability are reduced, the fiber length is preferably 0.1 mm or less.

In addition, the small-diameter inorganic fibers preferably have a dendritic shape or a crimped shape. When the small-diameter inorganic fibers have such a shape, the small-diameter inorganic fibers are entangled with the large-diameter inorganic fibers and the inorganic particles 20 in the heat transfer suppression sheet 10. Therefore, the ability to retain the inorganic particles 20 is improved. When the heat transfer suppression sheet receives the pressing force or the wind pressure, it is prevented that the small-diameter inorganic fibers slide and move, and thus the mechanical strength against the pressing force or the impact from the outside is improved.

The dendritic shape is a two-dimensionally or three-dimensionally branched structure, for example, a feather-like shape, a tetrapot shape, a radial shape, or a three-dimensional mesh-like shape.

When the small-diameter inorganic fibers 31 have dendritic shape, the average fiber diameter thereof can be obtained by measuring the diameters of a trunk portion and a branch portion at several points by SEM and calculating an average value thereof.

The crimped shape is a structure in which fibers are bent in various directions. As one of methods for quantifying the crimped form, it is known to calculate the crimp degree from an electron micrograph, and the crimp degree can be calculated from, for example, the following formula.

$$\text{Crimp degree}(\%)=(\text{fiber length}-\text{distance between the ends of the fiber})/(\text{fiber length})\times 100$$

Here, both the fiber length and the distance between the ends of the fiber are measurement values on the electron micrograph. That is, these are the fiber length and the distance between the ends of the fiber under projection onto a two-dimensional plane, and are shorter than actual values. Based on the formula, the crimp degree of the small-diameter inorganic fibers is preferably 10% or more, and more preferably 30% or more. When the crimp degree is small, the ability to retain the inorganic particles 20, the entanglement (network) between the large-diameter inorganic fibers or with the large-diameter inorganic fibers is less likely to be formed.

As described above, the average fiber diameter of any one of the first inorganic fibers 30 and the second inorganic fibers 31 is preferably larger than the average fiber diameter of the other. However, in the present invention, the average fiber diameter of the first inorganic fibers 30 is more preferably larger than the average fiber diameter of the second inorganic fibers 31. When the average fiber diameter of the first inorganic fibers 30 is large, the glass transition point of the first inorganic fibers 30 is low and the first inorganic fibers 30 soften quickly. Therefore, as the temperature rises, it becomes membranous and gets hard. On the other hand, when the average fiber diameter of the second inorganic fibers 31 is small, the small-diameter second inorganic fibers 31 remain in the form of fibers even if the temperature rises. Therefore, the structure of the heat transfer suppression sheet 10 can be maintained and powder falling can be prevented.

It is most preferable that both large-diameter inorganic fibers having the linear shape or the needled shape and small-diameter inorganic fibers having the dendritic shape or the crimped-shape are used as the first inorganic fiber 30, and both large-diameter inorganic fibers having the linear shape or the needle shape and small-diameter inorganic fibers having the dendritic shape or the crimped shape are used as the second inorganic fiber 31 because the retaining effect of the inorganic particles, mechanical strength, and shape retainability can be further enhanced.

<1-5. Contents of Inorganic Particles, First Inorganic Fibers, and Second Inorganic Fibers>

A content of the inorganic particles 20 is preferably 30 mass % or more and 94 mass % or less with respect to the total mass of the heat transfer suppression sheet 10, the content of the first inorganic fibers 30 is preferably 3 mass % or more and 30 mass % or less with respect to the total mass of the heat transfer suppression sheet 10, and the content of the second inorganic fibers 31 is preferably 3 mass % or more and 30 mass % or less with respect to the total mass of the heat transfer suppression sheet 10.

More preferably, with respect to the total mass of the heat transfer suppression sheet 10, the content of the inorganic particles 20 is 60 mass % or more and 90 mass % or less, the content of the first inorganic fibers 30 is 5 mass % or more and 15 mass % or less, and the content of the second inorganic fibers 31 is 5 mass % or more and 15 mass % or less. By setting such a content, heat absorption and heat insulating effect by the inorganic particles 20, the shape retainability, pressing force resistance, and wind pressure resistance by the first inorganic fibers 30, and the ability of the second inorganic fibers 31 to retain the inorganic particles 20 are exhibited in a well-balanced manner.

<1-6. Other Blending Materials>

An organic fiber, an organic binder, or the like may be blended in the heat transfer suppression sheet 10 as necessary. All of these are useful for the purpose of reinforcing the heat transfer suppression sheet 10 and improving the moldability, and the total amount thereof is preferably 10 mass % or less with respect to the total amount of the sheet.

The kinds of the organic fibers, the organic binder, and the like to be used are not particularly limited, and examples of the organic fibers include pulp fibers and polyester fibers. As the organic binder, a preferable binder can be selected according to a production method. The organic binder that can be selected in the present invention will be described later.

<1-7. Thickness of Heat Transfer Suppression Sheet>

The thickness of the heat transfer suppression sheet 10 is not particularly limited, and is preferably 0.05 mm or more and 5 mm or less. When the thickness is less than 0.05 mm, sufficient mechanical strength cannot be imparted to the heat transfer suppression sheet 10. On the other hand, when the thickness is more than 5 mm, the heat transfer suppression sheet 10 may be difficult to form.

[2. Production Method of Heat Transfer Suppression Sheet]

The heat transfer suppression sheet 10 is produced by molding a material including at least the inorganic particles 20, the first inorganic fibers 30, and the second inorganic fibers 31 by a dry molding method or a wet molding method. As the dry molding method, for example, a press molding method (dry press molding method) and an extrusion molding method (dry extrusion molding method) can be used.

<2-1. Production Method Using Dry Press Molding Method>

In the dry press molding method, the inorganic particles 20, the first inorganic fibers 30, the second inorganic fibers 31, and if necessary, the organic fibers, the organic binder, and the like are put into a mixer such as a V-type mixer at a predetermined proportion. Then, after the materials put into the mixer are sufficiently mixed, a mixture is put into a predetermined mold and press-molded, so that the heat transfer suppression sheet 10 can be obtained. At the time of press forming, heating may be performed as necessary.

A press pressure during press forming is preferably in a range of 0.98 MPa or more and 9.80 MPa or less. When the press pressure is less than 0.98 MPa, the strength of the heat transfer suppression sheet 10 to be obtained may not be maintained, and the heat transfer suppression sheet 10 may collapse. On the other hand, when the press pressure is more than 9.80 MPa, the processability may be reduced due to excessive compression, or solid heat transfer may increase due to an increase in the bulk density, and the heat insulating property may be reduced.

When using the dry press molding method, polyvinyl alcohol (PVA) is preferably used as the organic binder, whereas the organic binder is not particularly limited as long as it is an organic binder generally used when using the dry press molding method.

<2-2. Production Method Using Dry Extrusion Molding Method>

In the dry extrusion molding method, water is added to the inorganic particles 20, the first inorganic fibers 30, the second inorganic fibers 31, and if necessary, the organic fibers, the organic binder, and the like which are a binder, and the mixture is kneaded by a kneader to prepare a paste. Thereafter, the obtained paste is extruded from a slit-shaped nozzle using an extrusion molding machine, and further dried, so that the heat transfer suppression sheet 10 can be obtained. When using the dry extrusion molding method, methyl cellulose, water-soluble cellulose ether, and the like are preferably used as the organic binder, whereas the organic binder is not particularly limited as long as it is an organic binder generally used when using the dry extrusion molding method.

FIG. 2 is an SEM photograph showing a cross section of the heat transfer suppression sheet according to the embodiment of the present invention produced by the dry extrusion molding method. As shown in FIG. 2, the heat transfer suppression sheet includes the inorganic particles 20, the large-diameter first inorganic fibers 30, and the small-diameter second inorganic fibers 31. Numerous minute spaces are formed between the inorganic particles 20, between the inorganic particles 20 and the inorganic fibers 30 and 31, and between the inorganic fibers 30 and 31, and the heat insulating effect by air is also exhibited, so that the heat transfer prevention performance is excellent.

<2-3. Production Method Using Wet Molding Method>

In the wet molding method, the inorganic particles 20, the first inorganic fibers 30, the second inorganic fibers 31, and if necessary, the organic binder as the binder are mixed in water, and the mixture is stirred with a stirrer to prepare a mixed liquid. Thereafter, the obtained mixed liquid is poured into a molding machine in which a filtration mesh is formed at a bottom surface, and the mixed liquid is dehydrated through the mesh to prepare a wet sheet. Thereafter, the obtained wet sheet is heated and pressurized, so that the heat transfer suppression sheet 10 can be obtained.

Prior to a heating and pressurizing step, a ventilation drying treatment in which hot air is passed through the wet sheet to dry the sheet may be performed, whereas the wet sheet may be heated and pressurized in a wet state without performing the ventilation drying treatment. When the wet molding method is used, cationic starch or an acrylic resin can be selected as the organic binder.

[3. Battery Pack]

In the battery pack according to the present invention, the heat transfer suppression sheet 10 is interposed between the battery cells. Specifically, as shown in FIG. 3, a battery pack 100 includes a plurality of battery cells 101 arranged side by side, connected in series or in parallel, and accommodated in a battery case 110, and the heat transfer suppression sheet 10 is interposed between the battery cells 101.

In such a battery pack 100, even when one battery cell 101 is thermally runaway to reach a high temperature, and expands or ignites, the influence on adjacent other battery cell 101 is prevented by the heat transfer suppression sheet 10 excellent in the heat transfer prevention effect and the strength at the high temperature. Therefore, in the battery pack according to the present invention, a chain of the thermal runaway of the battery cells is prevented, and even if the thermal runaway occurs in one battery cell 101, damage is reduced to the minimum.

Although various embodiments are described above with reference to the drawings, it goes without saying that the present invention is not limited to such examples. It is apparent to those skilled in the art that various changes and modifications can be conceived within the scope of the claims, and it is also understood that such variations and modifications belong to the technical scope of the present invention. In addition, constituent elements in the embodiments described above may be combined freely within a range not departing from the spirit of the present invention.

The present application is based on a Japanese patent application (No. 2020-119430) filed on Jul. 10, 2020, contents of which are incorporated herein by reference.

REFERENCE SIGNS LIST 10 heat transfer suppression sheet
20 inorganic particles
30 first inorganic fibers
31 second inorganic fibers
100 battery pack
110 battery case

The invention claimed is:

1. A heat transfer suppression sheet comprising:
inorganic particles comprising wet silica,
first inorganic fibers, and
second inorganic fibers,
wherein the first inorganic fibers are amorphous fibers,
the first inorganic fibers and the second inorganic fibers are randomly oriented, respectively;
and
the second inorganic fibers contain at least one kind selected from amorphous fibers having a glass transition point higher than that of the first inorganic fibers and crystalline fibers;
wherein with respect to a total mass of the heat transfer suppression sheet,
a content of the inorganic particles is 30 mass % or more and 94 mass % or less,
a content of the first inorganic fibers is 3 mass % or more and 30 mass % or less, and
a content of the second inorganic fibers is 3 mass % or more and 30 mass % or less; and
wherein an average fiber diameter of the first inorganic fibers is 1 μm or more and 20 μm or less and an average fiber diameter of the second inorganic fibers is 1 nm or more and less than 1 um.;
wherein the second inorganic fibers have a dendritic shape or a crimped shape; and
a fiber length of each of the second inorganic fibers is 0.1 mm or less.

2. The heat transfer suppression sheet according to claim 1,
wherein the first inorganic fibers have a glass transition point of less than 700° C.

3. The heat transfer suppression sheet according to claim 1,
wherein the first inorganic fibers are fibers containing $SiO_2$, and
the second inorganic fibers are fibers containing at least one kind selected from silica fibers, alumina fibers, alumina silicate fibers, zirconia fibers, and mineral-based fibers.

4. The heat transfer suppression sheet according to claim 3,
wherein the first inorganic fibers are glass fibers, and
the second inorganic fibers are the mineral-based fibers.

5. The heat transfer suppression sheet according to claim 1,
wherein the inorganic particles have an average secondary particle diameter of 0.01 μm or more and 200 μm or less.

6. The heat transfer suppression sheet according to claim 1,
wherein the inorganic particles contain at least one kind selected from oxide particles, carbide particles, nitride particles, and inorganic hydrate particles.

7. The heat transfer suppression sheet according to claim 6,
wherein the inorganic particles contain the oxide particles.

8. The heat transfer suppression sheet according to claim 7,
wherein the oxide particles have an average primary particle diameter of 0.001 μm or more and 50 μm or less.

9. The heat transfer suppression sheet according to claim 6,
wherein the oxide particles contain at least one kind selected from silica, titania, zirconia, zircon, barium titanate, zinc oxide, and alumina.

10. The heat transfer suppression sheet according to claim 6,
wherein the inorganic particles contain at least one kind selected from nanoparticles, hollow particles, and porous particles.

11. The heat transfer suppression sheet according to claim 10,
wherein the inorganic particles contain the nanoparticles.

12. The heat transfer suppression sheet according to claim 10,
wherein the nanoparticles are silica nanoparticles.

13. The heat transfer suppression sheet according to claim 10,
wherein the nanoparticles have an average primary particle diameter of 1 nm or more and 100 nm or less.

14. The heat transfer suppression sheet according to claim 9,
wherein the oxide particles contain titania.

15. A battery pack comprising a plurality of battery cells connected in series or in parallel,
wherein the heat transfer suppression sheet according to claim 1 is interposed between the battery cells.

* * * * *